United States Patent
Miyashita et al.

(10) Patent No.: US 11,381,191 B2
(45) Date of Patent: Jul. 5, 2022

(54) MOTOR CONTROL APPARATUS FOR DETERMINING MOTOR TYPE AND IMAGE FORMING APPARATUS

(71) Applicant: CANON KABUSHIKI KAISHA, Tokyo (JP)

(72) Inventors: Takuya Miyashita, Kawasaki (JP); Eijiro Ohashi, Tokyo (JP); Yasukazu Maeda, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 281 days.

(21) Appl. No.: 16/733,680

(22) Filed: Jan. 3, 2020

(65) Prior Publication Data
US 2020/0235689 A1    Jul. 23, 2020

(30) Foreign Application Priority Data

Jan. 22, 2019  (JP) .............................. JP2019-008598
Nov. 7, 2019   (JP) .............................. JP2019-202622

(51) Int. Cl.
*H02P 23/14*    (2006.01)
*G03G 21/14*    (2006.01)
*G03G 15/00*    (2006.01)
*H02P 27/08*    (2006.01)

(52) U.S. Cl.
CPC ......... *H02P 23/14* (2013.01); *G03G 15/6529* (2013.01); *H02P 27/08* (2013.01)

(58) Field of Classification Search
CPC .... H02P 23/14; H02P 8/14; H02P 8/38; H02P 27/08; G03G 15/00; G03G 15/6529; G03G 21/14
See application file for complete search history.

(56) References Cited

U.S. PATENT DOCUMENTS

| | | | |
|---|---|---|---|
| 8,693,920 B2* | 4/2014 | Birumachi | G03G 15/751 399/167 |
| 9,670,017 B2* | 6/2017 | Anan | H02P 29/032 |
| 10,514,644 B2* | 12/2019 | Matsuzaki | G03G 15/5016 |
| 2017/0214351 A1* | 7/2017 | Lelkes | H02P 23/14 |
| 2020/0033788 A1 | 1/2020 | Ohashi et al. | |

FOREIGN PATENT DOCUMENTS

| | | | | |
|---|---|---|---|---|
| EP | 2437391 A | | 4/2012 | |
| JP | 2002-199780 A | | 7/2002 | |
| JP | 2007-089286 A | | 4/2007 | |
| JP | 2007089286 A | * | 4/2007 | ............... H02P 8/14 |
| JP | 2014-128147 A | | 7/2014 | |
| JP | 2014128147 A | * | 7/2014 | ............... H02P 6/12 |
| WO | WO-2005109623 A1 | * | 11/2005 | ............. H02P 27/06 |

OTHER PUBLICATIONS

Co-pending U.S. Appl. No. 16/748,118, filed Jan. 21, 2020.
Co-pending U.S. Appl. No. 16/743,576, filed Jan. 15, 2020.

* cited by examiner

*Primary Examiner* — Nguyen Q. Ha
(74) *Attorney, Agent, or Firm* — Venable LLP

(57) ABSTRACT

A motor control apparatus includes: an excitation unit configured to excite a plurality of excitation phases of a motor; a measurement unit configured to measure a physical amount that changes according to an inductance of at least one of a plurality of coils that make up the plurality of excitation phases, when each of the plurality of excitation phases is excited; and a determination unit configured to determine a type of the motor based on measurement values of the physical amount measured by the measurement unit when each of the plurality of excitation phases is excited.

18 Claims, 8 Drawing Sheets

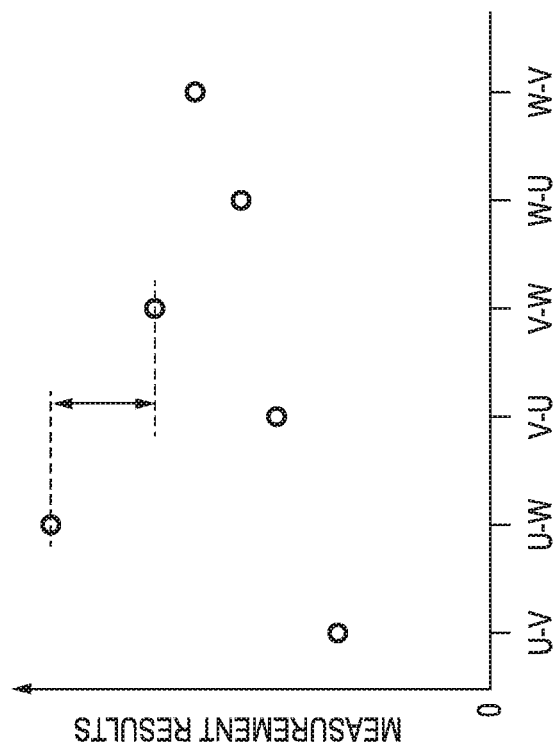
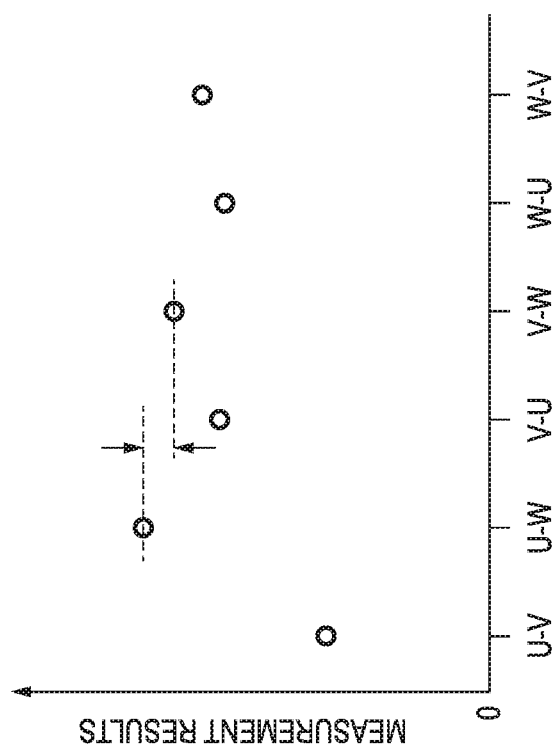

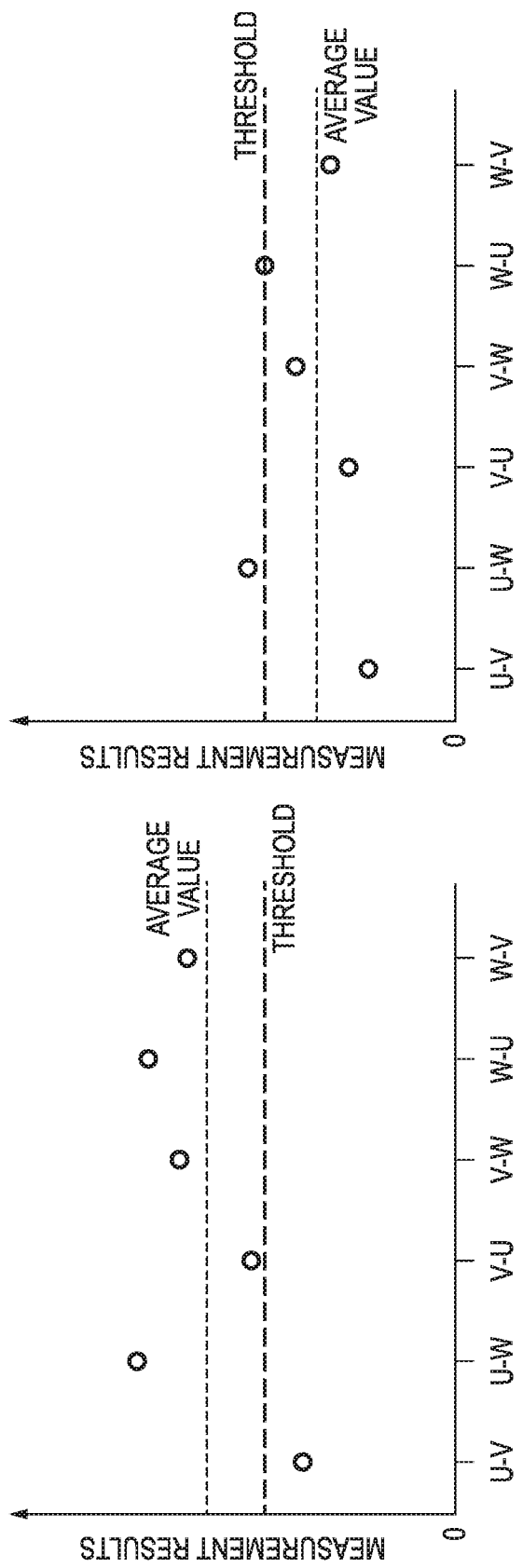

MOTOR CONTROL APPARATUS FOR DETERMINING MOTOR TYPE AND IMAGE FORMING APPARATUS

BACKGROUND OF THE INVENTION

Field of the Invention

The present invention relates to technology for controlling a motor, and in particular relates to technology for performing determination on a motor to be controlled.

Description of the Related Art

In image forming apparatuses, a DC brushless motor, a brushed DC motor, a stepping motor, or the like is used for a driving source of a rotating member. A sensorless motor that does not have a Hall element for detecting the rotation position of a rotor is also used as a DC brushless motor. EP2437391 discloses a configuration for estimating the rotation position of a rotor of a sensorless motor even when a power supply voltage is unstable.

In EP2437391, a condition for applying a pulse voltage is changed when a power supply voltage is unstable. However, in the configuration of EP2437391, when using a plurality of motors having coils with different inductances and rotors with different magnetic forces, the condition for applying a pulse voltage cannot be changed to a condition suitable for the motor to be controlled.

SUMMARY OF THE INVENTION

According to an aspect of the present invention, a motor control apparatus includes: an excitation unit configured to excite a plurality of excitation phases of a motor; a measurement unit configured to measure a physical amount that changes according to an inductance of at least one of a plurality of coils that make up the plurality of excitation phases, when each of the plurality of excitation phases is excited; and a determination unit configured to determine a type of the motor based on measurement values of the physical amount measured by the measurement unit when each of the plurality of excitation phases is excited.

Further features of the present invention will become apparent from the following description of exemplary embodiments with reference to the attached drawings.

BRIEF DESCRIPTION OF THE DRAWINGS

FIGS. 6A and 6B are diagrams illustrating motor determination processing according to an embodiment.

FIGS. 8A and 8B are diagrams illustrating motor determination processing according to an embodiment.

DESCRIPTION OF THE EMBODIMENTS

Figure 1:
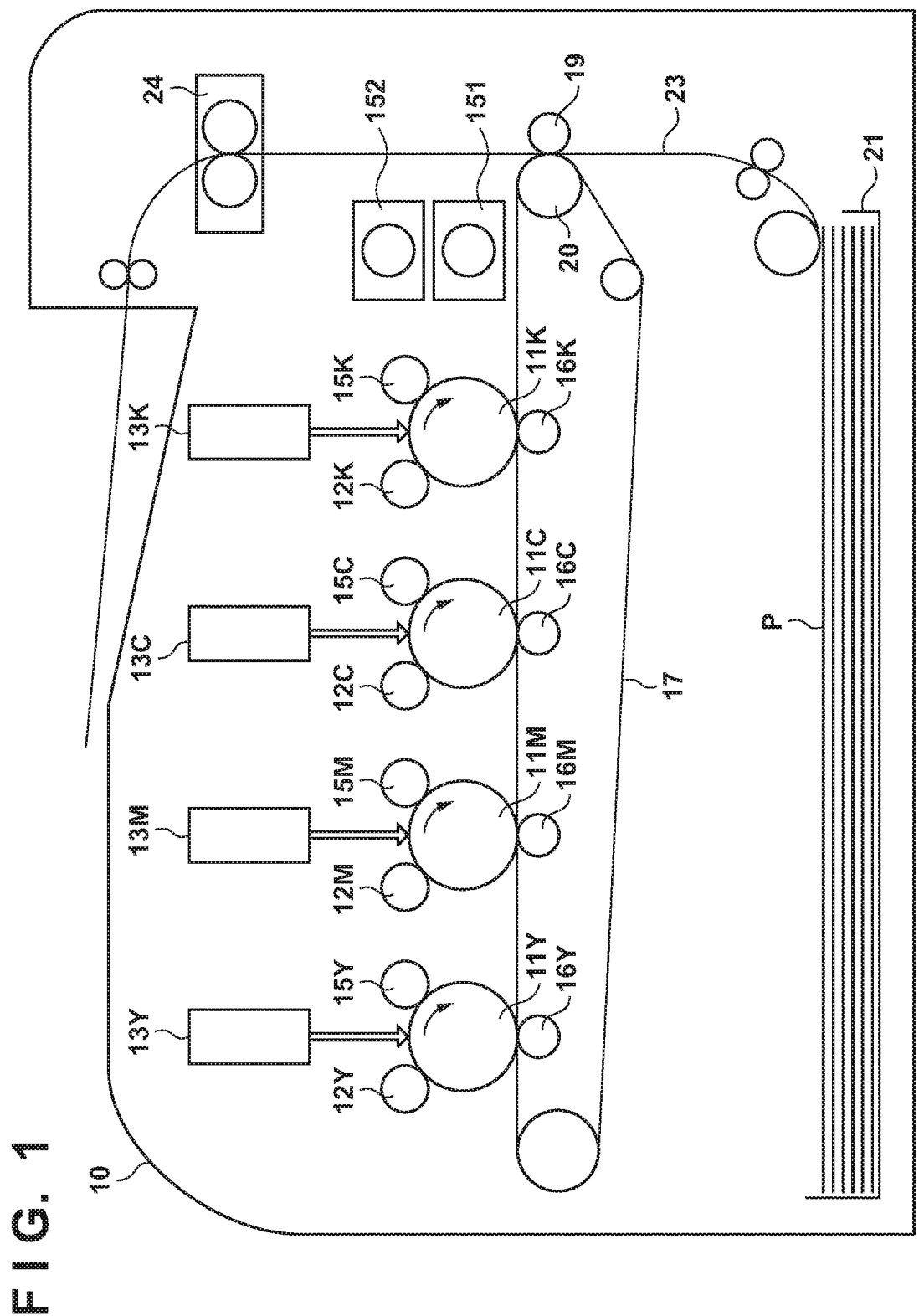
FIG. 1 is a diagram illustrating a configuration of an image forming apparatus according to an embodiment.

Embodiments will be described below in detail with reference to the attached drawings. Note that the following embodiments do not limit the invention according to the scope of the claims. A plurality of features are described in the embodiments, but all of these features are not necessarily essential to the invention, and a plurality of features may be suitably combined. Furthermore, in the attached drawings, the same reference numerals are assigned to the same or similar configurations, and an overlapping description is omitted.

First Embodiment

FIG. 1 shows an image forming apparatus 10 according to this embodiment, which is a printer, a copier, a multi-function peripheral, a facsimile, or the like. The image forming apparatus 10 overlays toner images of four colors, namely yellow (Y), magenta (M), cyan (C), and black (K) to form a full-color image. In FIG. 1, Y, M, C and K at the ends of reference signs indicate that the colors of toner images with which members denoted by the reference signs are involved when the toner images were formed are respectively yellow, magenta, cyan, and black. Note that, in the following description, when it is not necessary to distinguish colors, reference signs without Y, M, C and K at their ends are used. A photosensitive member 11 is driven and rotated in the clockwise direction of the figure when forming an image. A charging unit 12 charges the surface of the photosensitive member 11 to a uniform potential. An exposure unit 13 exposes the surface of the photosensitive member 11 to light so as to form an electrostatic latent image on the photosensitive member 11. A developing roller 15 of a developing unit develops the electrostatic latent image of the photosensitive member 11 using toner by outputting a developing bias, and visualizes it as a toner image. A primary transfer unit 16 transfers the toner image formed on the photosensitive member 11, onto an intermediate transfer belt 17 by applying a primary transfer bias. Note that, as a result of toner images formed on the photosensitive members 11 being overlaid and transferred onto the intermediate transfer belt 17, a full-color image is formed on the intermediate transfer belt 17.

The intermediate transfer belt 17 is driven and rotated in the counter-clockwise direction of the figure by a drive roller 20. Accordingly, the toner image transferred onto the intermediate transfer belt 17 is conveyed to an opposing position of a secondary transfer unit 19. On the other hand, a recording member (sheet) P stored in a cassette 21 is conveyed along a conveyance path 23, and is conveyed to the opposing position of the secondary transfer unit 19. Rollers for conveying the recording member P are provided on the conveyance path 23. The secondary transfer unit 19 transfers the toner image on the intermediate transfer belt 17 onto the recording member P by applying a secondary transfer bias. The recording member P is then conveyed to a fixing device 24. The fixing device 24 applies heat and pressure to the recording member P, and fixes the toner image to the recording member P. After the toner image is fixed, the recording member P is discharged to the outside of the image forming apparatus.

In this embodiment, a motor 151 transmits its drive force to a photosensitive member 11K, a charging unit 12K, a developing roller 15K, a primary transfer unit 16K, and a drive roller 20K via a gear mechanism (not illustrated). A motor 152 transmits its drive force to photosensitive members 11Y, 11M, and 11C, charging units 12Y, 12M, and 12C, developing rollers 15Y, 15M, and 15C, and primary transfer units 16Y, 16M, and 16C via gear mechanisms (not illustrated).

Figure 2:
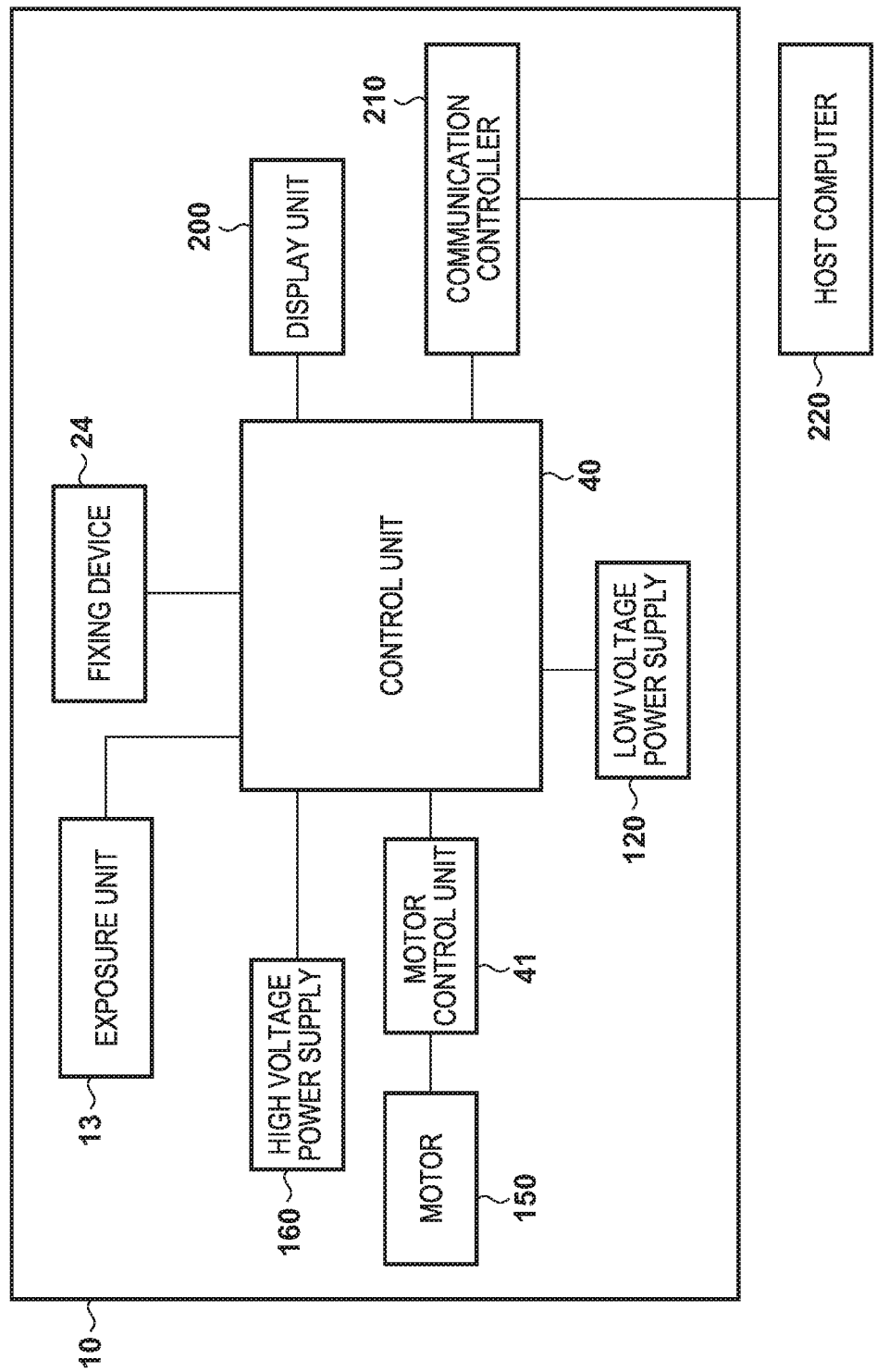
FIG. 2 is a diagram illustrating a control configuration of the image forming apparatus according to an embodiment.

FIG. 2 shows a control configuration of the image forming apparatus. A control unit 40, upon receiving image data of an image to be formed from a host computer 220 via a communication controller 210, starts image formation. When image formation is started, the control unit 40 controls a motor control unit 41 so as to drive and rotate motors 150 that include the motor 151 and the motor 152, and perform rotation drive control of rotating members such as the photosensitive member 11, conveyance control of the recording member P, and the like. The control unit 40 also controls the exposure unit 13 so as to form an electrostatic latent image on the photosensitive member 11. Furthermore, the control unit 40 controls a high voltage power supply 160 so as to output a bias for image formation to the charging unit 12, the developing roller 15, the primary transfer unit 16, and the secondary transfer unit 19. Accordingly, a toner image is formed on the recording member P. In addition, the control unit 40 controls the fixing device 24 so as to fix a toner image to the recording member P. A low voltage power supply 120 outputs a DC voltage. The DC voltage output by the low voltage power supply 120 is used for driving and rotating the motor 151 and the motor 152, for example. The control unit 40 displays the status of the image forming apparatus in a display unit 200. Note that the control unit 40 includes a microcomputer (processor) and a memory. The memory stores various types of control programs and data, and the microcomputer controls the units of the image forming apparatus 10 based on the various types of control programs and data stored in the memory.

Figure 3:
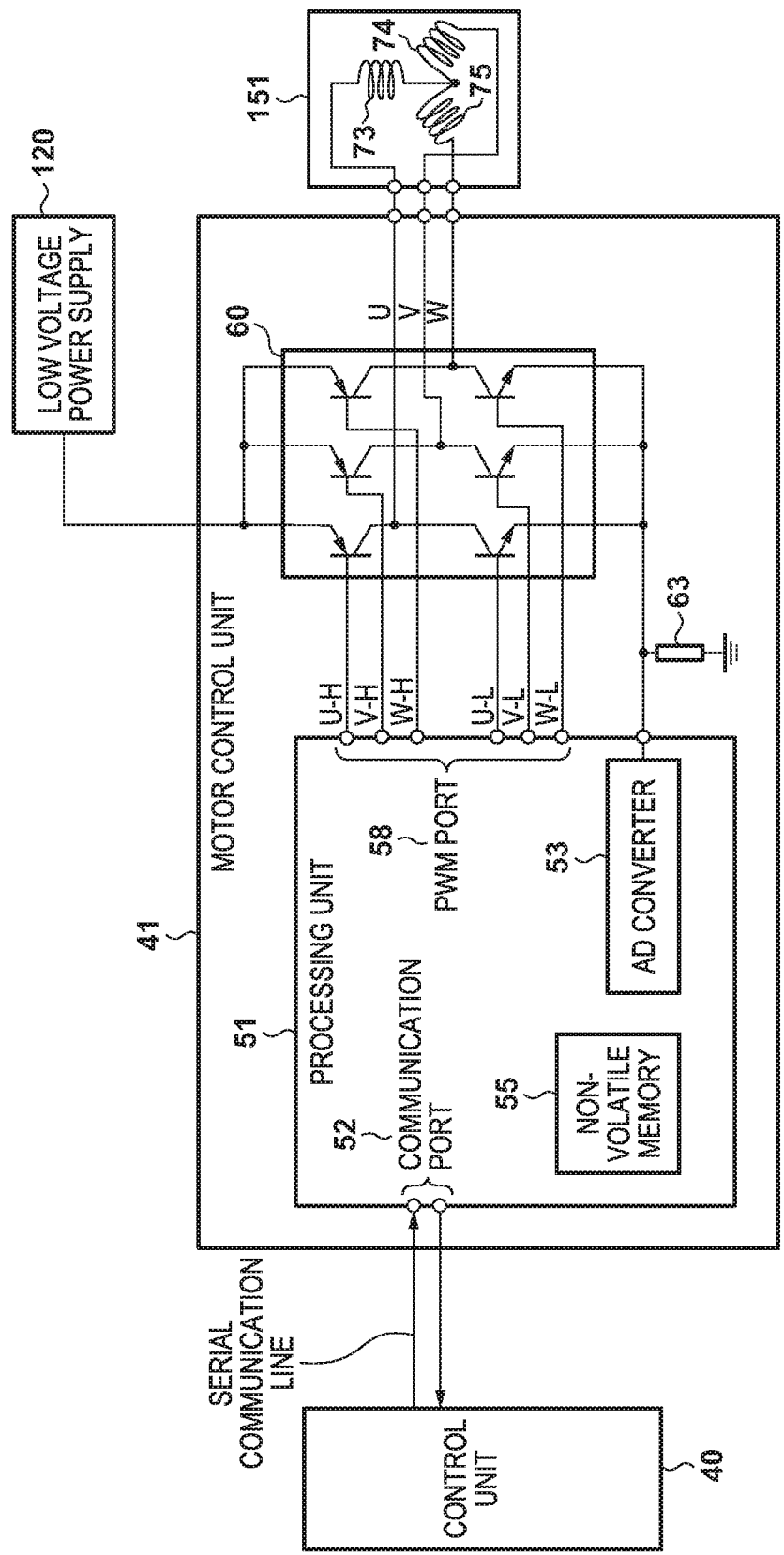
FIG. 3 is a diagram illustrating a configuration of a motor control unit according to an embodiment.

Next, a configuration of the motor control unit 41 that controls the motor 151 will be described with reference to FIG. 3. Note that the motor 152 has a configuration similar to that of the motor 151, and also has a similar control configuration, and thus a description of the motor 152 is omitted. The motor control unit 41 includes a processing unit 51 realized by a microcomputer and the like. A communication port 52 performs serial data communication with the control unit 40. A pulse width modulation (PWM) port 58 outputs PWM signals for driving switching elements of a three-phase inverter 60. The switching elements of the three-phase inverter 60 are, for example, FETs, and are driven by the PWM signals. The three-phase inverter is supplied with a DC voltage from the low voltage power supply 120. As a result of the switching elements of the three-phase inverter 60 being turned on/off using the PWM signals, excitation currents (coil currents) flow through a plurality of coils 73 (U phase), 74 (V phase), and 75 (W phase) of the motor 151. In this manner, the three-phase inverter 60 operates as an excitation unit that excites the motor 151. In addition, the excitation currents in the coils 73, 74, and 75 are converted into a voltage by a resistor 63, and is input to an AD converter 53 of the processing unit 51, as a value indicating the excitation currents. A nonvolatile memory 55 is a storage unit that stores data to be used for processing that is performed by the processing unit 51, and the like.

Figure 4:
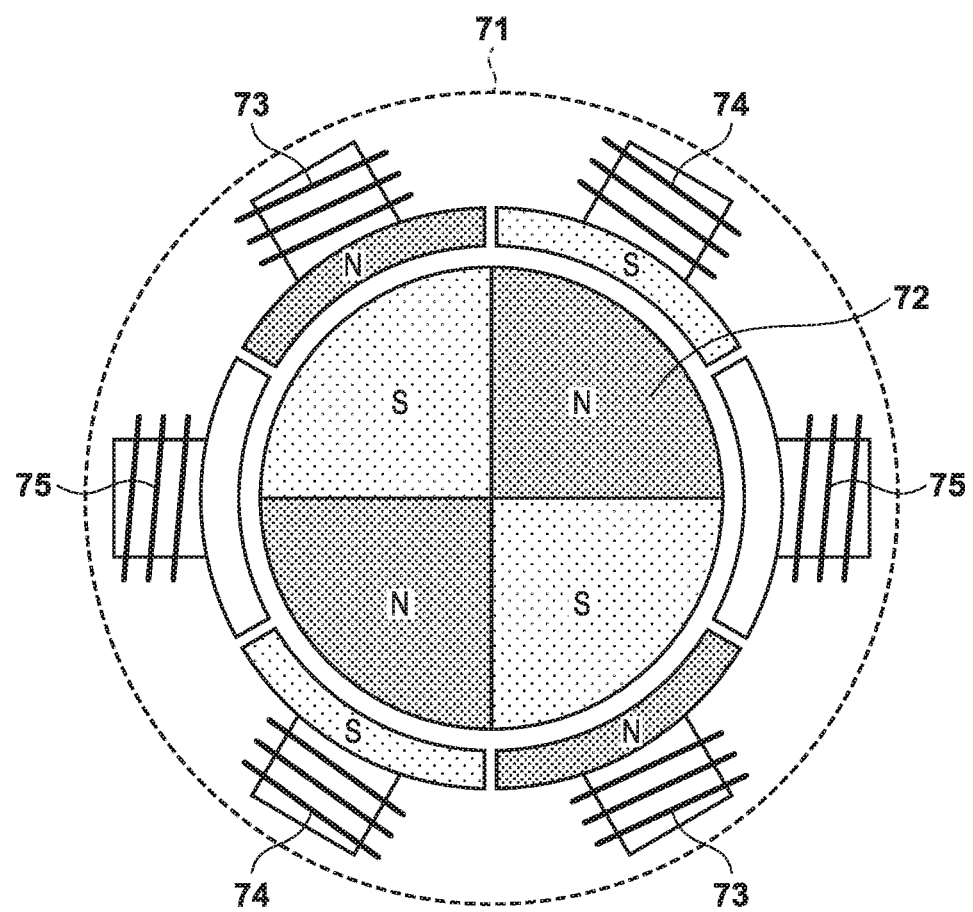
FIG. 4 is a diagram illustrating a configuration of a motor according to an embodiment.

Next, the structure of the motor 151 will be described with reference to FIG. 4. In this embodiment, the motor 151 includes a stator 71 having six slots and a rotor 72 having four poles. The stator 71 includes coils 73, 74, and 75 of three respective phases (U, V, and W). The rotor 72 is constituted by permanent magnets, and includes two sets of N and S poles. Here, in general, a coil such as the coil 73, 74, or 75 has a configuration in which a copper wire is wound around a core that is formed by stacking electrical steel sheets. Also, the magnetic permeability of an electrical steel sheet decreases when an external magnetic field is present. The inductance of a coil is proportional to the magnetic permeability of a core, and therefore when the magnetic permeability of the core decreases, the inductance of the coil also decreases. For example, because the U-phase coil 73 in FIG. 4 opposes only an S pole of the rotor 72, the degree of reduction in inductance of the U-phase coil 73 is larger than that of the W-phase coil 75 that opposes both an S pole and an N pole of the rotor 72. Also, the amount of change in inductance differs depending on whether or not the direction of a magnetic field generated by an excitation current is the same as the direction of an external magnetic field. Specifically, in a state in FIG. 4, when an excitation current is caused to flow such that the direction of the magnetic field generated by the U-phase coil 73 is the same as the magnetic field generated by the opposing S pole of the rotor 72, that is, the U phase is an N pole, the amount of reduction in inductance increases relative to a case where the excitation current is caused to flow in a direction such that the U phase is an S pole. As described above, the detected inductance differs depending on the stopping position of the rotor 72 and the excitation phase.

There are six excitation phases, namely U-V, U-W, V-U, V-W, W-U, and W-V phases for the motor 151 of this embodiment. Note that the excitation in the X-Y phase means that an excitation current is caused to flow from the X-phase coil to the Y-phase coil. As described above, while the rotor 72 is stopped, the inductance that is detected when a certain excitation phase is excited differs depending on a stopping position of the rotor 72. The inductance also differs depending on an excitation phase that is excited. If the inductance differs, the rate of rise of a current also differs. Therefore, if the excitation phases are excited only for a predetermined period while the rotor 72 is stopped, excitation currents are measured, and the largest value is detected, the largest value that is detected differs depending on an excitation phase, for example, as shown in FIGS. 5A and 5B.

Here, when the inductances of the coils 73 to 75 of the motor 151 increase, the excitation currents decrease, and thus the largest value also decreases. Conversely, when the inductances of the coils 73 to 75 decrease, the excitation currents increase, and thus the largest value also increases. In addition, if the magnetic force of the rotor 72 is high, the influence of the magnetic force of the rotor 72 on the inductance is large, and thus the difference in the largest value of the excitation currents when the excitation phases are excited increases. Conversely, if the magnetic force of the rotor 72 is low, the influence of the magnetic force of the rotor 72 on the inductance is small, and thus the difference in the largest value of the excitation currents when the excitation phases are excited is small.

Figure 5A:
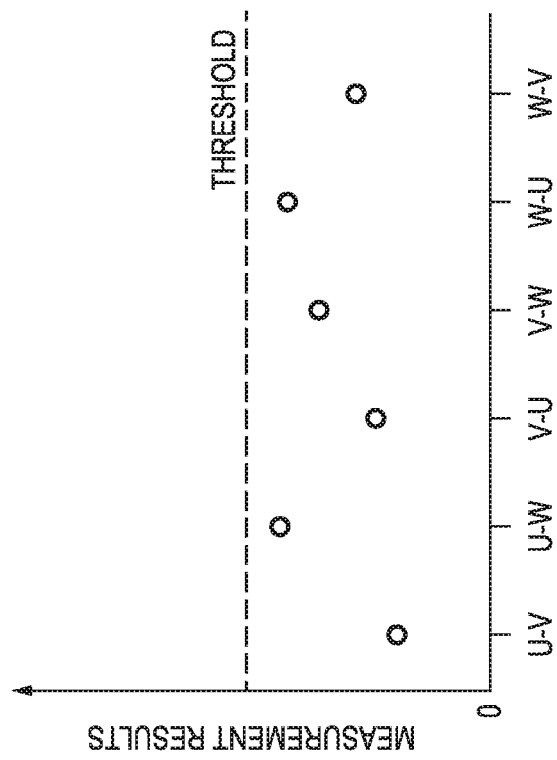
FIGS. 5A and 5B are diagrams illustrating motor determination processing according to an embodiment.
Figure 5B:
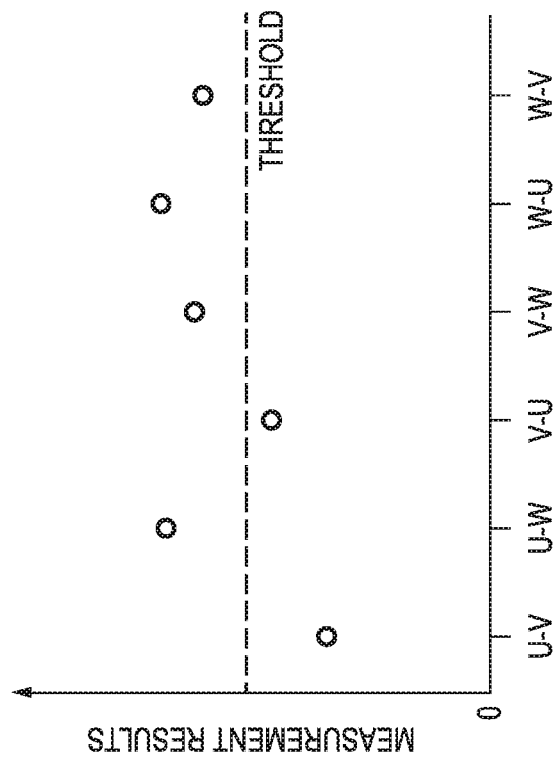

In this embodiment, as shown in FIGS. 5A and 5B, the processing unit 51 excites the excitation phases for a predetermined period, and determines a type of a motor to be controlled, based on the largest value of excitation currents measured while the excitation phases are excited. In the following description, the largest value of excitation currents of the excitation phases measured in this manner is referred to as a measurement value or measurement result of the excitation phases. There are two determination methods. A first method is a method for performing determination based on the magnitude of measurement values, and a second method is a method for performing determination based on the difference between measurement values of the excitation phases. For example, if a determination is made as to which motor is to be controlled from among a plurality of motors having the coils 73 to 75 with different inductances, the first method can be used. Also, if a determination is made as to which motor is to be controlled from among a plurality of motors having the rotors 72 with different magnetic forces, the second method can be used.

First, the first method will be described. Note that, in the following description, two types of motors having the coils 73 to 75 with different inductances are used for the image forming apparatus 10, and a motor with a smaller inductance is referred to as a motor A, and a motor with a larger inductance is referred to as a motor B. FIGS. 5A and 5B show measurement results of the respective excitation phases of the motor A and the motor B. The processing unit 51 notifies the control unit 40 of whether or not the largest measurement result exceeds a predetermined threshold, and the control unit 40 determines whether or not the motor that is being used is the motor A or the motor B, according to whether or not the largest measurement result exceeds the predetermined threshold. In FIG. 5A, there are measurement results that exceed the threshold, but, in FIG. 5B, all of the measurement results are smaller than the threshold. In this case, if there is a measurement result that exceeds the threshold, the control unit 40 determines that the motor that is being used is the motor A, and if there is no measurement result that exceeds the threshold, determines that the motor that is being used is the motor B. The control unit 40 then selects and sets, based on the determined type of the motor 151, parameters for controlling the motor 151, such as a voltage of the low voltage power supply 120, a control gain, a filter constant, a voltage application pattern, and a current amount during forced commutation.

Next, the second method will be described. Note that, in the following description, two types of motors having the rotors 72 with different materials, sizes, structures, and the like are used for the image forming apparatus 10. If the materials, sizes, structures, and the like are different, the magnetic forces of the rotors 72 are also different. In the following description, a motor in which the magnetic force of the rotor 72 is smaller is referred to as a motor C and a motor in which the magnetic force of the rotor 72 is larger is referred to as a motor D. FIGS. 6A and 6B show measurement results of the excitation phases of the motor C and the motor D. The processing unit 51 notifies the control unit 40 of whether or not the difference between the largest measurement result and the second largest measurement result exceeds a threshold, and the control unit 40 determines whether the motor 151 that is being used is the motor C or the motor D, in accordance with whether or not the difference exceeds the threshold. The difference in FIG. 6A is smaller than the difference in FIG. 6B. Note that, in this example, the difference in FIG. 6A does not exceed the threshold, but the difference in FIG. 6B exceeds the threshold. In this case, if the difference does not exceed the threshold, the control unit 40 determines that the motor is the motor C, and if the difference exceeds the threshold, determines that the motor is the motor D. The control unit 40 then selects and sets, based on the determined type of the motor 151, parameters for controlling the motor 151, such as a voltage of the low voltage power supply 120, a control gain, a filter constant, a voltage application pattern, and a current amount during forced commutation.

Note that, in FIGS. 6A and 6B, the difference between the largest measurement result and the second largest measurement result is compared with the threshold, but there are cases where the largest measurement result and the second largest measurement result are substantially the same regardless of the magnitude of the magnetic force of each of the rotors 72, depending on the stopping position of the rotor 72. In this case, if the difference between the largest measurement result and the second largest measurement result is used, an error arises in determination on the type of the motor. Therefore, a configuration can also be adopted in which the difference between the largest measurement result and the third largest measurement result or any measurement result smaller than the third largest measurement result is compared with the threshold.

Note that, in this embodiment, in each of the first method (FIGS. 5A and 5B) and the second method (FIGS. 6A and 6B), a determination is made between two types of motors using one threshold. However, a configuration can be adopted in which the magnitude of inductance or the magnitude of the magnetic force of the rotor 72 is evaluated in three or more stages using two or more thresholds, and a determination can be made between three or more types of motors. Furthermore, a determination can be made between types of motors with different inductances and different magnetic forces of the rotors 72 by using both the first method and the second method. For example, if one threshold is used in each of the first method and the second method, a determination can be made between, in total, four types of motors, namely a motor with a small inductance and a small magnetic force, a motor with a small inductance and a large magnetic force, a motor with a large inductance and a small magnetic force, and a motor with a large inductance and a large magnetic force.

Note that, in this embodiment, regarding the excitation phases, the largest value of excitation currents is measured and detected as a physical amount that changes according to the magnitude of the inductance. However, it is sufficient that the physical amount that changes according to the inductances of the coils 73 to 75 can be detected, and the present invention is not limited to a configuration for detecting the largest value of excitation currents. For example, it is also possible to adopt a configuration for detecting the speed of a change in the excitation current during excitation. For example, it is also possible to adopt a configuration for measuring a current value after a predetermined time has elapsed since excitation. It is also possible to use an average value, an effective value, a peak value, an average value excluding a peak value, an integrated value, and the like when the excitation phases are excited for a predetermined time, for example.

In addition, in this embodiment, the largest value of excitation currents is used as a physical amount that changes according to the magnitude of inductance. Here, the smaller the inductance is, the larger the largest value of excitation currents becomes. Therefore, when a physical amount that decreases as the inductance decreases is used as a physical amount that changes according to the magnitude of inductance, a determination criterion in the above description changes according to the physical amount. Note that a person skilled in the art can understand the way the determination criterion changes, and thus a detailed description thereof is omitted. Note that the first method shown in FIGS. 5A and 5B corresponds to a method of comparing a measurement result indicating that the impedance is the smallest with a threshold, and, if the measurement result indicating that the impedance is the smallest is below the threshold, determining that the motor is the motor A, and otherwise determining that the motor is the motor B. Also, the second method shown in FIGS. 6A and 6B corresponds to a method of obtaining the difference between a measurement result indicating that the impedance is the smallest and a measurement result indicating that the impedance is the second smallest, and, if the difference does not exceed a threshold, determining that the motor is the motor C, and otherwise determining that the motor is the motor D.

Second Embodiment

Next, a second embodiment will be described with a focus on differences from the first embodiment. In the first embodiment, a difference in the inductances of the coils 73 to 75 is determined based on the largest value of measurement result. However, when the property of the motor 151 such as the magnetic force of the rotor 72 is very strong, there are cases where the largest measurement result is very large compared to other measurement results. In such cases, if measurement results excluding the largest measurement result are used, the type of the motor 151 can be determined more accurately.

Figure 7A:
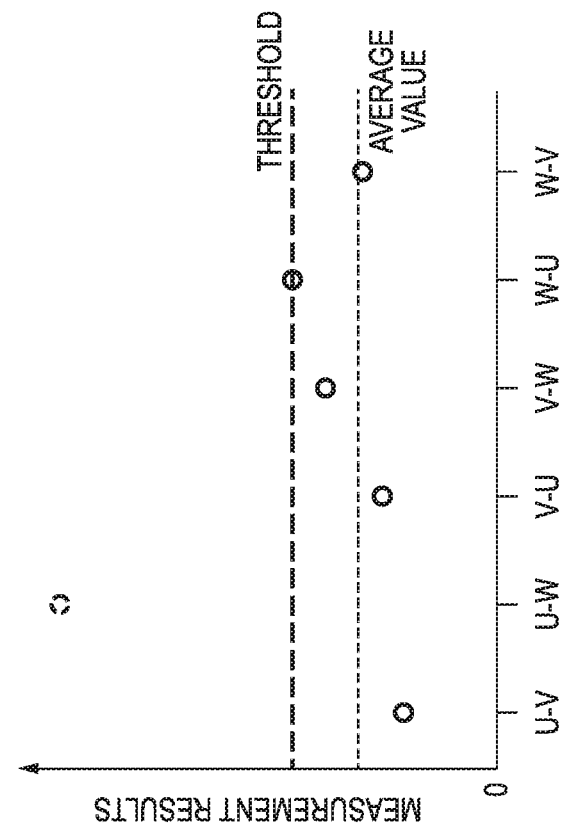
FIGS. 7A and 7B are diagrams illustrating motor determination processing according to an embodiment.
Figure 7B:
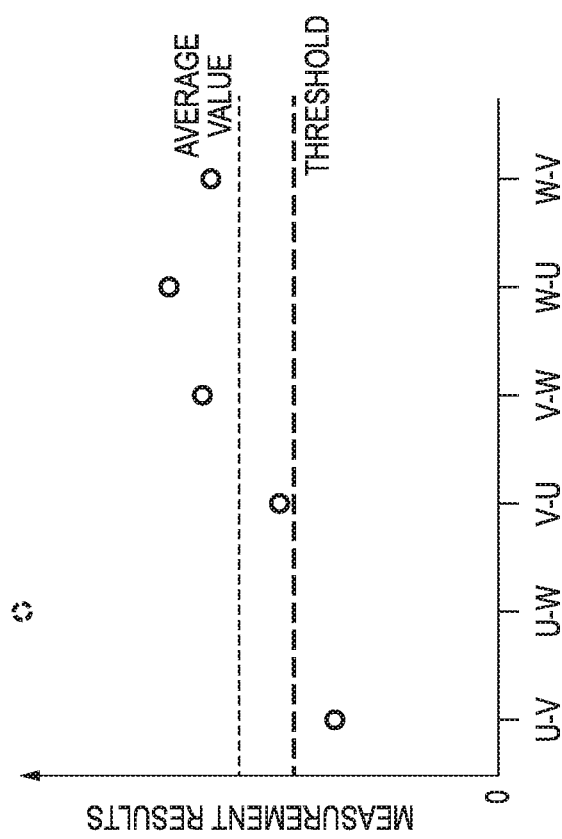

Note that, in the following description, two types of motors having the coils 73 to 75 with different inductances are used for the image forming apparatus 10, and the motor with a smaller inductance is referred to as a motor E, and the motor with a larger inductance is referred to as a motor F. FIGS. 7A and 7B show measurement results of the excitation phases of the motor E and the motor F. The magnetic forces of the rotors 72 of the motor E and the motor F are very high, and thus the largest measurement result is very large compared with the other measurement results. In this embodiment, the processing unit 51 notifies the control unit 40 of whether or not a measurement result that exceeds a predetermined threshold is included in the second largest measurement result and measurement results smaller than the second largest measurement result. In FIG. 7A, there are measurement results that exceed the threshold, but, in FIG. 7B, the second largest measurement result and the measurement results smaller than the second largest measurement result are all smaller than the threshold. In this case, if there is a measurement result that exceeds the threshold, the control unit 40 determines that the motor is the motor E, and if there is no measurement result that exceeds the threshold, determines that the motor is the motor F. The control unit 40 then selects and sets, based on the determined type of the motor 151, parameters for controlling the motor 151, such as a voltage of the low voltage power supply 120, a control gain, a filter constant, a voltage application pattern, and a current amount during forced commutation.

Note that a configuration can also be adopted in which the average value of the second largest measurement result and measurement results smaller than the second largest measurement result is compared with a threshold instead of comparing the second largest measurement result and measurement results smaller than the second largest measurement result with the threshold. FIGS. 7A and 7B also show the average value of the second largest measurement result and measurement results smaller than the second largest measurement result. The control unit 40 determines that the motor is the motor E if the average value exceeds the threshold, and determines that the motor is the motor F if the average value does not exceed the threshold.

Note that, in FIGS. 7A and 7B, the second largest measurement result or a measurement result smaller than the second largest measurement result is compared with the threshold, but there are cases where, depending on the stopping position of the rotor 72, the largest measurement result and the second largest measurement result are substantially the same. In this case, if the second largest measurement result or a measurement result smaller than the second largest measurement result is used, an error may occur in determination on a motor type. Therefore, a configuration can also be adopted in which any one of the third largest measurement result and measurement results smaller than the third largest measurement result is compared with a threshold.

Third Embodiment

Next, a third embodiment will be described with a focus on differences from the first and second embodiments. If the property of the motor 151 such as the magnetic force of the rotor 72 is very low, there are cases where, in a method of the second embodiment, accurate determination cannot be performed. In such cases, if the average value of all of the measurement results is used, the type of the motor 151 can be determined accurately.

In the following description, two types of motors having the coils 73 to 75 with different inductances are used for the image forming apparatus 10, and a motor with a smaller inductance is referred to as a motor G, and a motor with a larger inductance is referred to as a motor H. FIGS. 8A and 8B show measurement results of the excitation phases of the motor G and the motor H. The magnetic forces of the rotors 72 of the motor G and the motor H are low, and thus the difference between the largest measurement result and the smallest measurement result is small. In this embodiment, the processing unit 51 notifies the control unit 40 of whether or not the average value of all of the measurement results exceeds a threshold. In FIG. 8A, the average value exceeds the threshold, but, in FIG. 8B, the average value is smaller than the threshold. If the average value exceeds the threshold, the control unit 40 determines that the motor is the motor G, and if the average value does not exceed the threshold, determines that the motor is the motor H. The control unit 40 then selects and sets, based on the determined type of the motor 151, parameters for controlling the motor 151, such as a voltage of the low voltage power supply 120, a control gain, a filter constant, a voltage application pattern, and a current amount during forced commutation.

Other Embodiments

Note that, in the above embodiments, in order to determine a motor type, a physical amount that changes according to the magnitude of inductance is measured and detected. As described above, the physical amount that is measured and detected when the excitation phases are excited differs depending on the stopping position of the rotor 72 and an excitation phase that is excited, and thus the control unit 40 can determine a motor type, and can also determine the stopping position of the rotor 72. Accordingly, the control unit 40 selects and sets, based on the determined type of the motor 151, parameters for controlling the motor 151, and start forced commutation control based on the determined stopping position of the rotor 72.

Note that, in the above embodiments, the motor control unit 41, which is a constituent element of the image forming apparatus 10, is referred to as such, but the motor control unit 41 can also be an apparatus, and be referred to as a motor control apparatus. In addition, an apparatus that includes the control unit 40 and the motor control unit 41 can be a motor control apparatus. In addition, in the above embodiments, the motor 151 and the motor 152 cause a rotating member related to image formation of the image forming apparatus 10 such as the photosensitive member 11 to rotate, but the present invention can also be applied to a motor for conveying the recording member P. In addition, the configuration of the motor 151 and the motor 152 is not limited to the configuration shown in FIG. 4, and a motor with another pole number or another number of phases may also be adopted.

Embodiments of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-008598, filed on Jan. 22, 2019, and Japanese Patent Application No. 2019-202622, filed on Nov. 7, 2019, which are hereby incorporated by reference herein in their entirety.

What is claimed is:

1. A motor control apparatus comprising:
an excitation unit configured to excite a plurality of excitation phases of a motor;
a measurement unit configured to measure a plurality of measurement values of a physical amount that changes according to an inductance of each of a plurality of coils that make up the plurality of excitation phases by exciting each of the plurality of excitation phases; and
a determination unit configured to determine a type of the motor based on the plurality of measurement values measured by the measurement unit.

2. The motor control apparatus according to claim 1, wherein the determination unit is configured to determine the type of the motor by comparing the measurement values when each of the plurality of excitation phases is excited with one or more first thresholds.

3. The motor control apparatus according to claim 2, wherein the determination unit is configured to determine the type of the motor by comparing a first measurement value indicating a smallest inductance, from among the measurement values when each of the plurality of excitation phases is excited, with the one or more first thresholds.

4. The motor control apparatus according to claim 2, wherein the determination unit is configured to determine the type of the motor by comparing a second measurement value indicating a second smallest inductance, from among the measurement values when each of the plurality of excitation phases is excited, with the one or more first thresholds.

5. The motor control apparatus according to claim 2, wherein the determination unit is configured to determine the type of the motor by evaluating magnitudes of inductances of the plurality of coils through comparison with the one or more first thresholds.

6. The motor control apparatus according to claim 1, wherein the determination unit is configured to determine the type of the motor by comparing an average value of the measurement values when each of the plurality of excitation phases is excited, with one or more first thresholds.

7. The motor control apparatus according to claim 1, wherein the determination unit is configured to determine the type of the motor by comparing, from among the measurement values when each of the plurality of excitation phases is excited, an average value of the measurement values excluding a first measurement value indicating a smallest inductance, with one or more first thresholds.

8. The motor control apparatus according to claim 1, wherein the determination unit is configured to determine the type of the motor by comparing a difference between the measurement values when each of the plurality of excitation phases is excited, with one or more second thresholds.

9. The motor control apparatus according to claim 8, wherein the determination unit is configured to determine the type of the motor by comparing a difference between a first measurement value indicating a smallest inductance from among the measurement values when each of the plurality of excitation phases is excited and a third measurement value different from the first measurement value from among the measurement values when each of the plurality of excitation phases is excited, with the one or more second thresholds.

10. The motor control apparatus according to claim 9, wherein the third measurement value is a measurement value indicating a second smallest inductance, from among the measurement values when each of the plurality of excitation phases is excited.

11. The motor control apparatus according to claim 9, wherein the third measurement value is a measurement value that is different from a measurement value indicating a second smallest inductance, from among the measurement values when each of the plurality of excitation phases are excited.

12. The motor control apparatus according to claim 8, wherein the determination unit is configured to determine the type of the motor by evaluating a magnitude of magnetic force of a rotor of the motor through comparison with the one or more second thresholds.

13. The motor control apparatus according to claim 1, wherein each measurement value of the physical amount is a value that is based on excitation current when each of the plurality of excitation phases is excited.

14. The motor control apparatus according to claim 13, wherein each measurement value of the physical amount is a largest value or an integrated value of the excitation current when each of the plurality of excitation phases is excited only for a predetermined time.

15. The motor control apparatus according to claim 13, wherein each measurement value of the physical amount is a speed of change in the excitation current when each of the plurality of excitation phases is excited.

16. The motor control apparatus according to claim 1, wherein the determination unit determines the type of the motor based on the measurement values of the physical amount measured by the measurement unit when each of the plurality of excitation phases is excited, and determines a stopping position of a rotor of the motor.

17. A motor control apparatus comprising:
an excitation unit configured to excite a plurality of excitation phases of a motor;
a measurement unit configured to measure a plurality of measurement values of a physical amount that changes according to an inductance of each of a plurality of coils that make up the plurality of excitation phases by exciting each of the plurality of excitation phases; and
a determination unit configured to determine a parameter for controlling the motor based on the plurality of measurement values measured by the measurement unit.

18. An image forming apparatus comprising:
a rotating member for conveying a sheet along a conveyance path;
an image forming unit configured to form an image on the sheet that is conveyed on the conveyance path;
a motor for driving the rotating member or the image forming unit; and
a motor control unit configured to control the motor, wherein the motor control unit includes:
an excitation unit configured to excite a plurality of excitation phases of a motor,
a measurement unit configured to measure a plurality of measurement values of a physical amount that changes according to an inductance of each of a plurality of coils that make up the plurality of excitation phases by exciting each of the plurality of excitation phases, and
a determination unit configured to determine a type of the motor based on the plurality of measurement values measured by the measurement unit.

* * * * *